United States Patent
Burckart et al.

(10) Patent No.: US 8,880,634 B2
(45) Date of Patent: Nov. 4, 2014

(54) CACHE SHARING AMONG BRANCH PROXY SERVERS VIA A MASTER PROXY SERVER AT A DATA CENTER

(75) Inventors: Erik J. Burckart, Raleigh, NC (US); John P. Cammarata, Wake Forest, NC (US); Andrew J. Ivory, Wake Forest, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 13/410,380

(22) Filed: Mar. 2, 2012

(65) Prior Publication Data

US 2012/0166572 A1     Jun. 28, 2012

Related U.S. Application Data

(63) Continuation of application No. 12/908,964, filed on Oct. 21, 2010, now abandoned.

(51) Int. Cl.
  *G06F 15/16* (2006.01)
  *G06F 13/00* (2006.01)
  *G06F 17/30* (2006.01)

(52) U.S. Cl.
  CPC .............. *G06F 17/30* (2013.01); *G06F 13/00* (2013.01)
  USPC ............................ 709/213; 709/246; 370/241

(58) Field of Classification Search
  CPC .......... H04N 21/2181; H04N 21/4331; H04N 21/632; G06F 15/16; G06F 17/30
  USPC ................................... 709/213, 246; 370/241
  See application file for complete search history.

(56) References Cited

U.S. PATENT DOCUMENTS

| | | | |
|---|---|---|---|
| 6,505,200 B1 | 1/2003 | Ims et al. | |
| 6,848,079 B2 | 1/2005 | Ito | |
| 7,003,630 B1 | 2/2006 | Kissell | |
| 7,039,683 B1 | 5/2006 | Tran et al. | |
| 7,398,304 B2 * | 7/2008 | Smith et al. ................... | 709/218 |

(Continued)

FOREIGN PATENT DOCUMENTS

WO     9814894     4/1998

OTHER PUBLICATIONS

Office Action from U.S. Appl. No. 12/908,964 dated Nov. 6, 2012.
"Accelerating Application Response Times in Branch Offices," http://www.cisco.com/en/US/prod/collateral/contnetw/ps5680/ps6870/prod_white_paper0900aecd8051c07f.html, Nov. 6, 2006.
"Sun Java System Web Proxy Server," http://www.sun.com/servers/coolthreads/webproxyserver/datasheet.pdf, Apr. 8, 2008.

(Continued)

*Primary Examiner* — Tesfay Yohannes
(74) *Attorney, Agent, or Firm* — Robert A. Voigt, Jr.; Winstead, P.C.

(57) ABSTRACT

A method for cache sharing among branch proxy servers. A branch proxy sever receives a request for accessing a resource at a data center. The branch proxy server creates a cache entry in its cache to store the requested resource if the branch proxy server does not store the requested resource. Upon creating the cache entry, the branch proxy server sends the cache entry to a master proxy server at the data center to transfer ownership of the cache entry if the master proxy server did not store the resource in its cache. When the resource becomes invalid or expired, the master proxy server informs the appropriate branch proxy servers storing the resource to purge the cache entry containing this resource. In this manner, the master proxy server ensures that the cached resource is synchronized across the branch proxy servers storing this resource.

18 Claims, 5 Drawing Sheets

(56) References Cited

U.S. PATENT DOCUMENTS

| | | | |
|---|---|---|---|
| 7,752,394 B1* | 7/2010 | Rajkumar et al. | 711/133 |
| 7,853,525 B2* | 12/2010 | Yeates et al. | 705/40 |
| 7,873,787 B2* | 1/2011 | Goodman | 711/133 |
| 7,954,144 B1 | 5/2011 | Ebrahimi et al. | |
| 2002/0069241 A1 | 6/2002 | Narlikar et al. | |
| 2003/0004998 A1* | 1/2003 | Datta | 707/513 |
| 2003/0195940 A1* | 10/2003 | Basu et al. | 709/213 |
| 2003/0236883 A1 | 12/2003 | Takeshima et al. | |
| 2005/0138196 A1 | 6/2005 | Pfeffer et al. | |
| 2006/0221837 A1* | 10/2006 | Gardner et al. | 370/241 |
| 2006/0250988 A1* | 11/2006 | Garcia et al. | 370/260 |
| 2007/0005887 A1* | 1/2007 | Larson | 711/118 |
| 2007/0088852 A1* | 4/2007 | Levkovitz | 709/246 |
| 2007/0124541 A1 | 5/2007 | Lang et al. | |
| 2007/0192444 A1 | 8/2007 | Ackaouy et al. | |
| 2007/0233957 A1 | 10/2007 | Lev-Ran et al. | |
| 2009/0049247 A1* | 2/2009 | Henshaw et al. | 711/118 |
| 2009/0319473 A1 | 12/2009 | Rao et al. | |

OTHER PUBLICATIONS

"Microsoft Proxy Server 2.0," http://www.authorstream.com/Presentation/aSGuest31285-271170-aproxy-server-entertainment-ppt-powerpoint/, Nov. 14, 2009.

"Securing and Accelerating Branch Office Communications using ISA Server 2006," http://webcache.googleusercontent.com/search?q=cache:RC3o0b2wxmAJ:download.microsoft.com/download/e/7/6/e76fdda3-5c2c-4fbb-9c6f-3bcd0ed4b8ef/branch_Officewp.doc+Using+proxy+servers+at+branch+and+main+office+to+reduce+network+traffic&cd=1&hl=en&ct=clnk&gl=in, Jun. 2006.

"Using a Unihomed ISA Firewall at Branch Offices to Reduce WAN Bandwidth Usage and CAche SSL Respnoses from Main Office Web Servers," Thomas W. Shinder, http://www.isaserver.org/tutorials/Using-Unihonned-ISA-Firewall-Branch-Offices-Reduct-WAN-Bandwidth-Usage-Cache-SSL-Responses-Main-Office-Web-Servers.html, Jun. 13, 2006.

Office Action for U.S. Appl. No. 12/908,964 dated May 14, 2013.

* cited by examiner

CACHE SHARING AMONG BRANCH PROXY SERVERS VIA A MASTER PROXY SERVER AT A DATA CENTER

CROSS-REFERENCE TO RELATED APPLICATIONS

The present application is a continuation application of pending U.S. patent application Ser. No. 12/908,964, which was filed on Oct. 21, 2010, which is assigned to the assignee of the present invention. The present application claims priority benefits to U.S. patent application Ser. No. 12/908,964.

TECHNICAL FIELD

The present invention relates to data network configurations in business environments, and more particularly to cache sharing among branch proxy servers in branch offices via a master proxy server at a data center.

BACKGROUND

A data network configuration implemented in business environments typically involves centralizing data storage at a data center and providing this data (e.g., via a server at the data center) to a plurality of client computing devices over a wide area network (e.g., Internet). These client computing devices ("clients") may be located at "branch offices" of the company, such as in the retail, banking, and airline industry. In each branch office, client computing devices may be interconnected to each other using a local area network (LAN). Applications running on the client devices may require data from the data center, such as records, files, merchandising data, etc. However, the interconnection between the branch office and the data center is typically via a low bandwidth connection. Since these applications may require large amount of data, the slow connection leads to poor application performance.

As a result, companies may increase the bandwidth of the interconnection between the branch office and the data center. However, increasing the bandwidth of the interconnection is costly.

Alternatively, companies may add a proxy server at each branch office to serve as an intermediary for requests from clients seeking resources (e.g., file, merchandising data) from other servers at the data center. Once the proxy server has serviced the client's request, it may cache the resource for future requests for the resource. In this manner, when a client requests that resource, the proxy server may directly provide that resource instead of obtaining the resource from the data center. While this improves the performance of the branch application, each branch proxy server is independent of one another. That is, each branch proxy server is independent of the other branch proxy servers at the other branch offices. As a result, one branch proxy server may store a later version of the resource than another branch proxy server. A branch proxy server may even be storing an expired or invalid resource; whereas, another branch proxy server is storing a valid version of the same resource.

BRIEF SUMMARY

In one embodiment of the present invention, a method for cache sharing among branch proxy servers comprises receiving a request by a first proxy server in a branch office to access a resource at a data center. The method further comprises transmitting a request to a second proxy server at the data center to determine if the resource is located in a cache of the second proxy server in response to the first proxy server not storing the resource in its cache. Additionally, the method comprises creating a cache entry in the cache of the first proxy server to store the resource in response to the second proxy server not storing the resource in its cache. In addition, the method comprises sending the cache entry to the second proxy server to transfer ownership of the cache entry to the second proxy server.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for cache sharing among branch proxy servers. In one embodiment of the present invention, a branch proxy sever receives a request from a client in its branch office for accessing a resource at a data center. The branch proxy server transmits a request to a master proxy server at the data center to determine if the resource is located in its cache if the branch proxy server does not store the requested resource in its cache. The branch proxy server creates a cache entry in its cache to store the requested resource. Upon creating the cache entry, the branch proxy server sends the cache entry to the master proxy server to transfer ownership of the cache entry if the master proxy server did not store the resource in its cache. When the resource becomes invalid or expired, the master proxy server informs the appropriate branch proxy servers storing the resource to purge the cache entry containing this resource. The master proxy server may provide an updated version of the resource to be stored in place of the prior version thereby ensuring that all of the branch proxy servers storing this resource are storing the correct version. In this manner, the master proxy server ensures that the cached resource is synchronized across the branch proxy servers storing this resource thereby preventing the branch proxy servers from storing different versions or even invalid or expired versions of the resource.

While the following discusses the present invention in connection with a computing environment for business organizations with branch offices (e.g., banking, airline and retail industries), the principles of the present invention may be applied to other environments where cache entries need to be synchronized among proxy servers. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
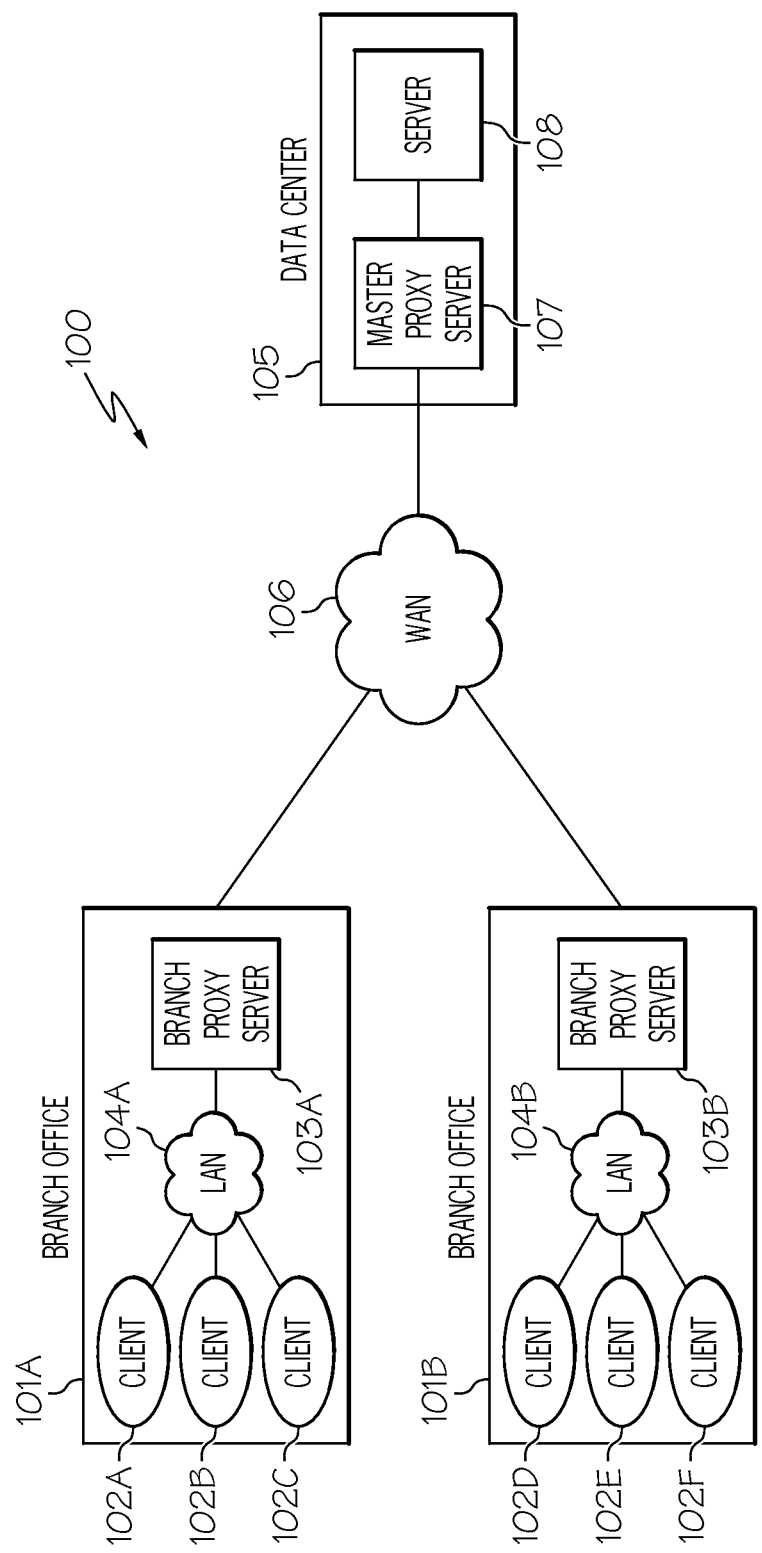
FIG. 1 illustrates a business computing environment in accordance with an embodiment of the present invention.

Referring now to the Figures in detail, FIG. 1 illustrates a suitable business computing environment 100 for practicing the principles of the present invention in accordance with an embodiment of the present invention. Computing environment 100 includes one or more branch offices 101A-101B. Branch offices 101A-101B may collectively or individually be referred to as branch offices 101 or branch office 101, respectively. Each branch office 101 includes one or more client computing devices "clients." For example, branch office 101A includes clients 102A-102C and branch office 101B includes clients 102D-102F. Clients 102A-102F may collectively or individually be referred to as clients 102 or client 102, respectively.

As further illustrated in FIG. 1, each branch office 101 may also include a branch proxy server connected to a client 102 via a local area network. For example, branch office 101A includes branch proxy server 103A that is connected to clients 102A-102C via local area network ("LAN") 104A. Similarly, branch office 101B includes branch proxy server 103B that is connected to clients 102D-102F via local area network 104B. Branch proxy servers 103A-103B may collectively or individually be referred to as branch proxy servers 103 or branch proxy server 103, respectively. A detailed description of the hardware configuration of branch proxy server 103 is provided further below in connection with FIG. 2. Furthermore, local area networks 104A-104B may collectively or individually be referred to as local area networks 104 or local area network 104, respectively.

Computing environment 100 further includes a data center 105 which is interconnected to branch offices 101 via a wide area network ("WAN") 106, such as the Internet. Data center 105 includes a master proxy server 107 and a sever 108 for providing the resources requested by clients 102. Master proxy server 107 is interconnected between wide area network 106 and server 108. A detailed description of the hardware configuration of master proxy server 107 is provided further below in connection with FIG. 2.

In one embodiment, branch proxy server 103 serves as an intermediary for requests from clients 102 seeking resources (e.g., file, merchandising data) from server 108 at data center 105. Similarly, master proxy server 107 servers as an intermediary for requests from branch proxy server 103 and server 108 at data center 105. Master proxy server 107 is configured to synchronize cache data among branch proxy servers 103 as discussed below in further detail.

Computing environment 100 is not to be limited in scope to any one particular computer architecture. Computing environment 100 may include any number of branch offices 101, where each branch office 101 may include any number of clients 102 interconnected with a branch proxy server 103 via a local area network 104. Furthermore, data center 105 may include any number of servers 108 providing resources requested by clients 102.

Figure 2:
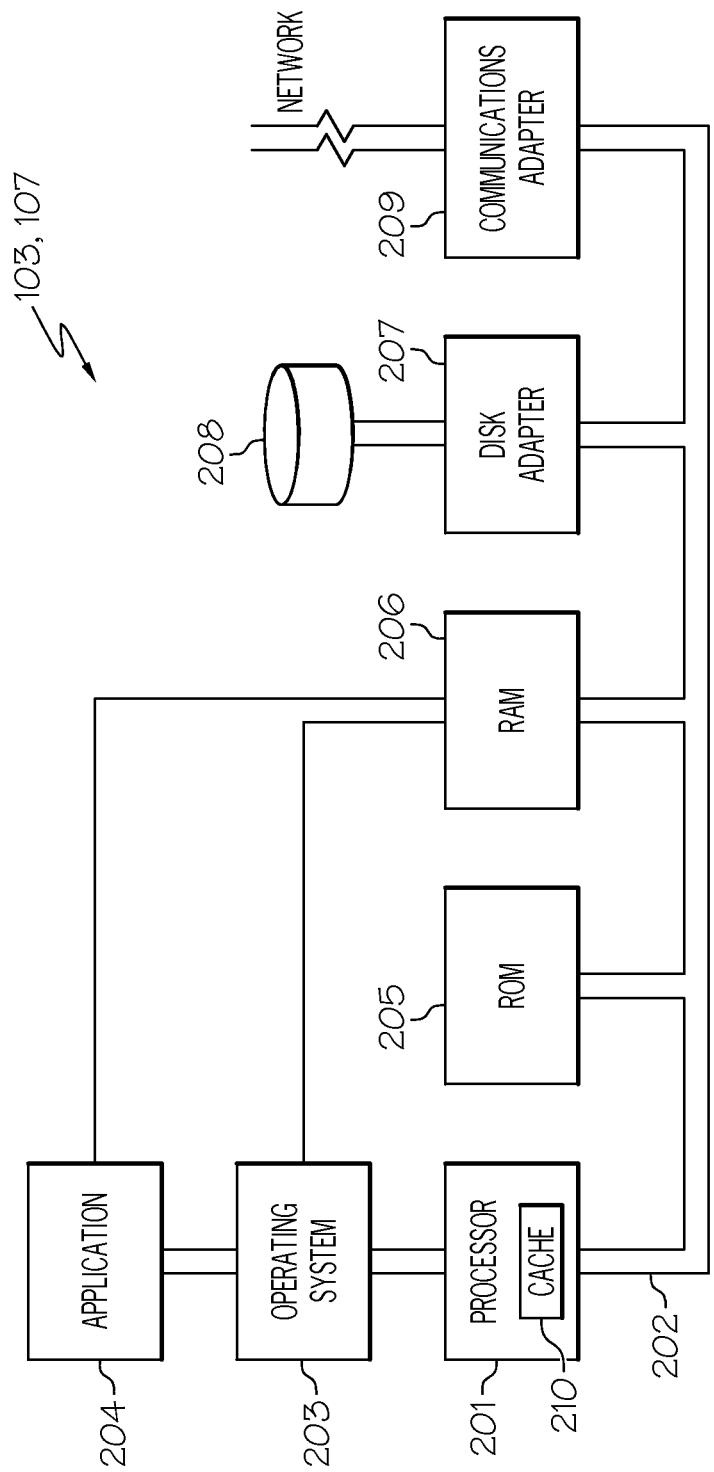
FIG. 2 is a hardware configuration of a branch proxy server and a master proxy server in accordance with an embodiment of the present invention.

Referring to FIG. 2, FIG. 2 illustrates an embodiment of a branch proxy server 103 (FIG. 1), master proxy server 107 (FIG. 1) which is representative of a hardware environment for practicing the present invention. Proxy servers 103, 107 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 for branch proxy server 103 may include, for example, an application for cache sharing among branch proxy servers 103 as discussed further below in association with FIGS. 3-4. Application 204 for master proxy server 107 may include, for example, an application for synchronizing cache data among branch proxy servers 103 as discussed further below in association with FIGS. 4-5.

Referring again to FIG. 2, read-only memory ("ROM") 205 may be coupled to system bus 202 and include a basic input/output system ("BIOS") that controls certain basic functions of proxy servers 103, 107. Random access memory ("RAM") 206 and disk adapter 207 may also be coupled to system bus 202. It should be noted that software components including operating system 203 and application 204 may be loaded into RAM 206, which may be proxy servers 103, 107 main memory for execution. Disk adapter 207 may be an integrated drive electronics ("IDE") adapter that communicates with a disk unit 208, e.g., disk drive. It is noted that the program for cache sharing among branch proxy servers 103 and for synchronizing cache data among branch proxy servers 103 as discussed further below in association with FIGS. 3-5, may reside in disk unit 208 or in application 204.

Proxy servers 103, 107 may further include a communications adapter 209 coupled to bus 202. Referring to FIG. 2, in conjunction with FIG. 1, communications adapter 209 of proxy server 103 may interconnect bus 202 with an outside network (not shown) thereby allowing proxy server 103 to communicate with data center 105 (e.g., master proxy server 107) and clients 102. Communications adaptor 209 of proxy server 107 may interconnect bus 202 with an outside network (not shown) thereby allowing proxy server 107 to communicate with server 108 as well as with branch proxy server 103.

Additionally, proxy servers 103, 107 may include a cache 210, such as a level-1 cache, to store resources as discussed further below in connection with FIGS. 3-5. While cache 210 is shown to be internal within processor 201, cache 210 may be located external to processor. Cache 210 may be any type of cache (e.g., physically indexed, physically tagged; virtually indexed, virtually tagged; virtually indexed, physically tagged).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, companies may add a proxy server at each branch office to serve as an intermediary for requests from clients seeking resources (e.g., file, merchandising data) from other servers at the data center. Once the proxy server has serviced the client's request, it may cache the resource for future requests for the resource. In this manner, when a client requests that resource, the proxy server may directly provide that resource instead of obtaining the resource from the data center. While this improves the performance of the branch application, each branch proxy server is independent of one another. That is, each branch proxy server is independent of the other branch proxy servers at the other branch offices. As a result, one branch proxy server may store a later version of the resource than another branch proxy server. A branch proxy server may even be storing an expired or invalid resource; whereas, another branch proxy server is storing a valid version of the same resource.

The principles of the present invention enable the cached resources to be synchronized across the branch proxy servers thereby ensuring that the client branch applications obtain the correct data while improving the performance of the client branch applications as discussed below in connection with FIGS. 3-5. FIG. 3 is a flowchart of a method for cache sharing among branch proxy servers 103 (FIG. 1). FIG. 4 is a diagram illustrating cache sharing among branch proxy servers 103. FIG. 5 is a flowchart of a method for synchronizing cache data among branch proxy servers 103.

Figure 3:
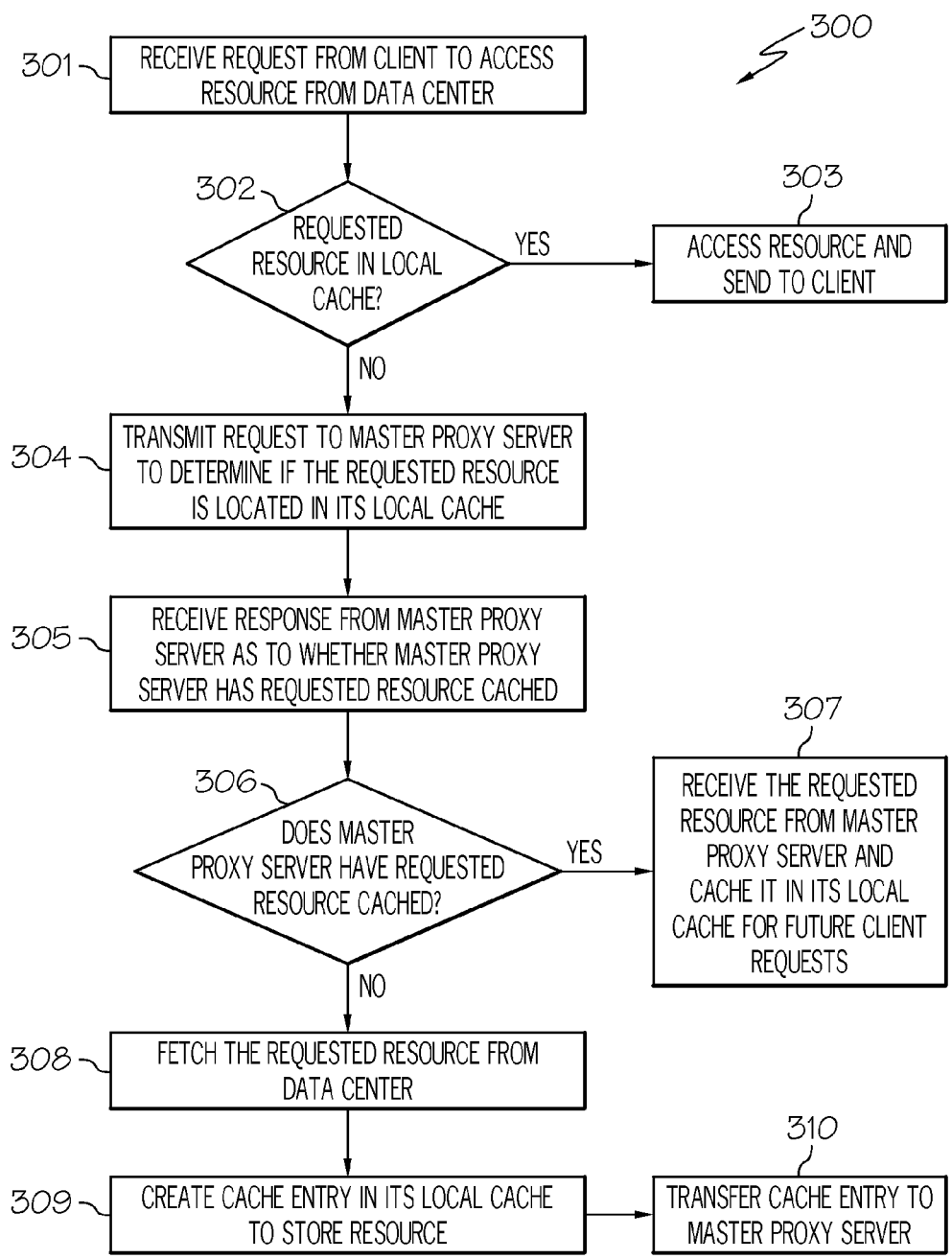
FIG. 3 is a flowchart of a method for cache sharing among branch proxy servers in accordance with an embodiment of the present invention.

Referring to FIG. 3, FIG. 3 is a flowchart of a method 300 for cache sharing among branch proxy servers 103 (FIG. 3) in accordance with an embodiment of the present invention.

Method 300 will be discussed in conjunction with FIG. 4, which is a diagram illustrating cache sharing among branch proxy servers 103 as well as illustrating the synchronization of cache data among branch proxy servers 103 in accordance with an embodiment of the present invention.

Figure 4:
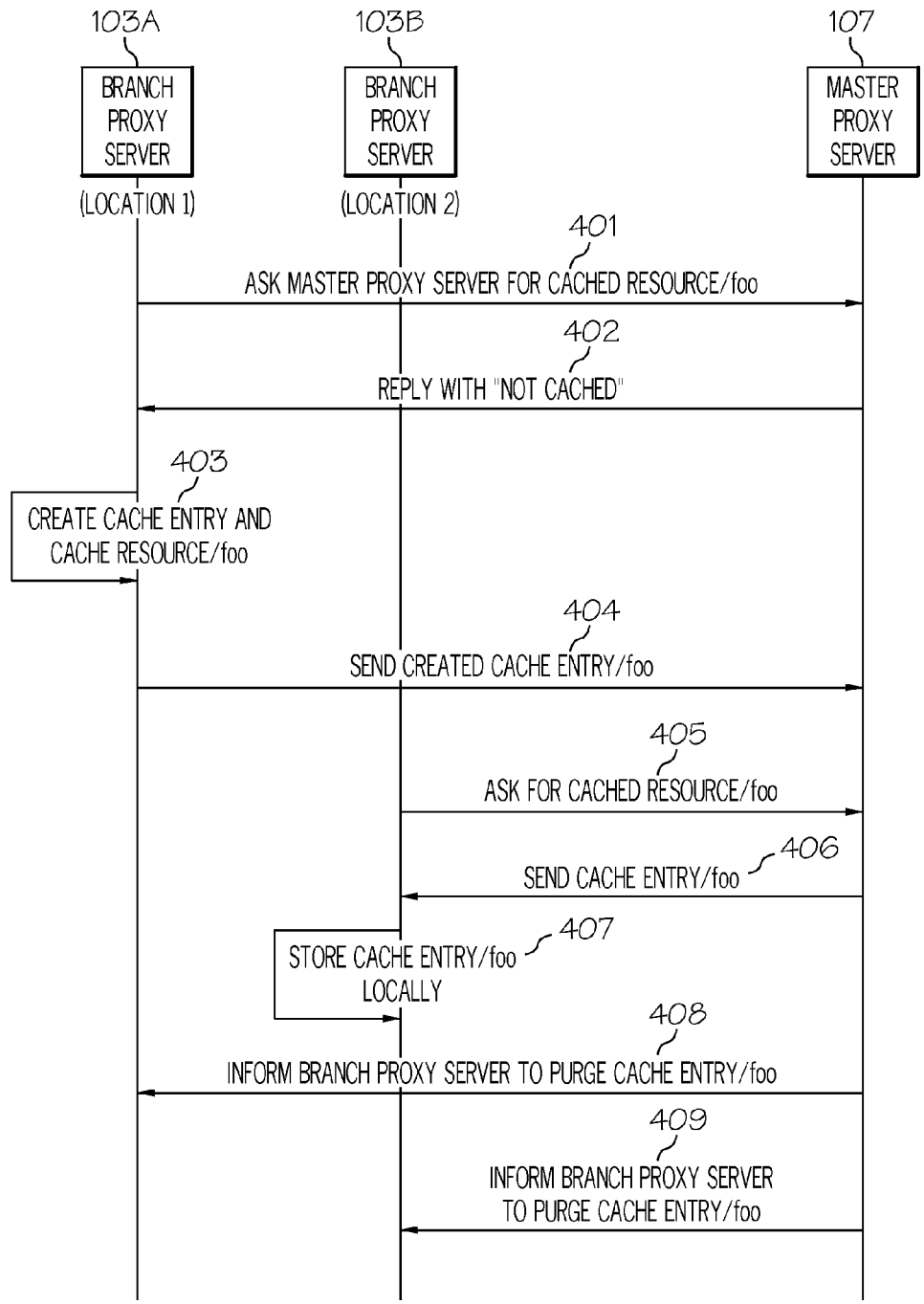
FIG. 4 is a diagram illustrating cache sharing among branch proxy servers in accordance with an embodiment of the present invention.

Referring again to FIG. 3, in conjunction with FIGS. 1-2 and 4, in step 301, branch proxy server 103 receives a request from client 102 to access a resource from data center 105 (e.g., server 108).

In step 302, a determination is made by branch proxy server 103 as to whether the requested resource is stored in its local cache 210.

If the requested resource is stored in its local cache 210, then, in step 303, branch proxy sever 103 accesses the resource and sends it to the requesting client 102.

If, however, the requested resource is not stored in its local cache 210, then, in step 304, branch proxy server 103 transmits a request to master proxy server 107 to determine if the resource is located in its local cache 210. As illustrated in FIG. 4, a business may have multiple branch proxy servers 103 (e.g., branch proxy server 103A, branch proxy server 103B) in various locations that are connected to master proxy server 107 at a data center 105. One of the branch proxy servers 103 (e.g., branch proxy server 103A) may request master proxy server 107 for the requested cached resource (in the example illustrated in FIG. 4, the requested resource is identified by "/foo") as identified by step 401 if the branch proxy server 103A does not store the requested resource locally in its cache 210.

Returning to FIG. 3, in conjunction with FIGS. 1-2 and 4, in step 305, branch proxy server 103 receives the response from master proxy sever 107 as to whether master proxy server 107 has the requested resource in its local cache 210. A determination is made by branch proxy server 103 in step 306 as to whether master proxy server 107 has the requested resource cached.

If master proxy server 107 has the requested resource cached, then, in step 307, branch proxy server 103 receives the requested resource from master proxy server 107 and caches it in its local cache 210 for future client requests.

If, however, master proxy server 107 does not have the requested resource cached, as illustrated in step 402 in FIG. 4, then, in step 308, branch proxy server 103 fetches the requested resource from data center 105 (e.g., server 108). Alternatively, branch proxy server 103 may request master proxy server 107 to fetch the requested resource from data center 105 (e.g., server 108) on its behalf.

In step 309, branch proxy server 103 creates a cache entry in its local cache 210 to store the fetched resource. Referring to FIG. 4, upon master proxy server 107 informing branch proxy server 103A that the requested resource is not cached in its local cache 210, branch proxy server 103A creates a cache entry in its local cache 210 and caches the requested resource in step 404.

Returning to FIG. 3, in conjunction with FIGS. 1-2 and 4, in step 310, branch proxy server 103 sends the cache entry created in step 309 that stores the requested resource to master proxy server 107 to transfer ownership of the cache entry to master proxy server 107 as illustrated in step 404 of FIG. 4.

Once master proxy server 107 acquires ownership of the cache entry that stores the requested resource, which involves caching the resource in its local cache 210 as discussed further below in connection with FIG. 5, master proxy server 107 will be able to provide the resource upon it being requested by other branch proxy servers 103. For example, as illustrated in FIG. 4, branch proxy server 103B may request for the resource identified in FIG. 4 as "/foo" in step 405 after master proxy server 107 has taken ownership of the cache entry for the resource "/foo" in step 404.

Upon receiving the request for the resource "/foo," master proxy server 107 sends the requested resource to branch proxy server 103A in step 406. Branch proxy server 103A then caches the resource in its local cache 210 in step 407 (similarly discussed in step 307 of FIG. 3).

In some implementations, method 300 may include other and/or additional steps that, for clarity, are not depicted. Further, in some implementations, method 300 may be executed in a different order presented and that the order presented in the discussion of FIGS. 3 and 4 is illustrative. Additionally, in some implementations, certain steps in method 300 may be executed in a substantially simultaneous manner or may be omitted.

As discussed above, ownership of the cache entry created by branch proxy server 103 is transferred to master proxy server 107 in step 310 of FIG. 3. Once master proxy server 107 has ownership of the cache entry for the resource, master proxy server 107 ensures that the cached resource is synchronized across branch proxy servers 103 in various branch offices 101 using the process described in FIG. 5. That is, master proxy server 107 ensures that the resource that is cached in multiple branch proxy servers 103 are all the same version and up-to-date using the process described in FIG. 5.

Figure 5:
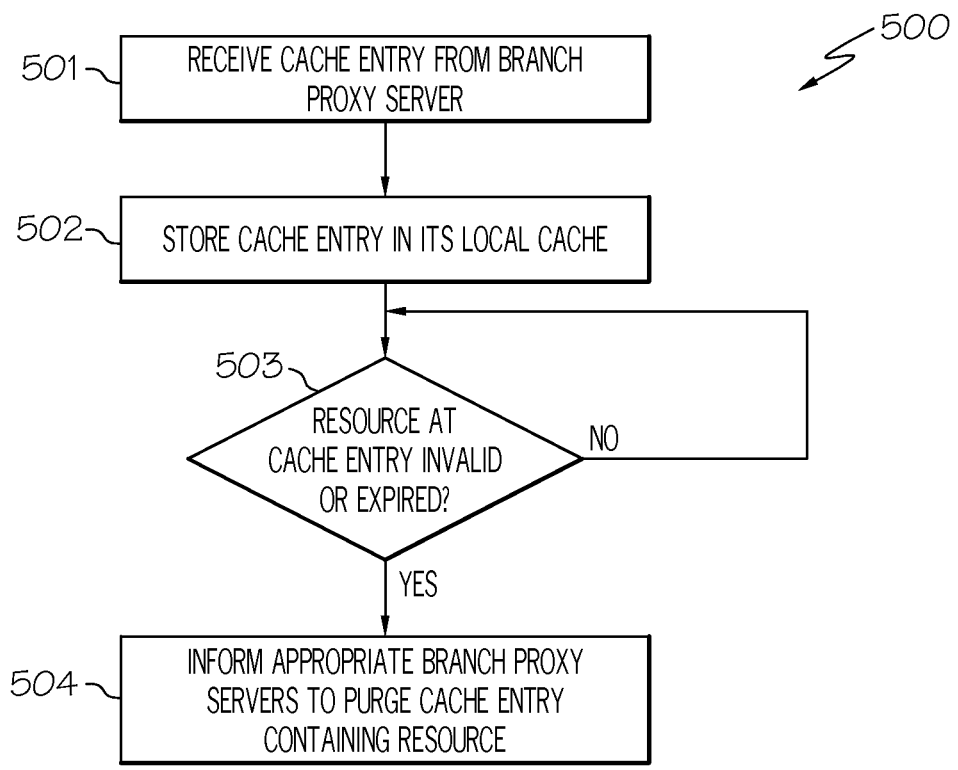
FIG. 5 is a flowchart of a method for synchronizing cache data among branch proxy servers in accordance with an embodiment of the present invention.

FIG. 5 is a flowchart of a method 500 for synchronizing cache data among branch proxy servers 103 (FIG. 1) in accordance with an embodiment of the present invention.

Referring to FIG. 5, in conjunction with FIGS. 1-4, in step 501, master proxy server 107 receives the cache entry that branch proxy server 103 created in step 309 that stores the resource requested by client 102 in order to transfer ownership of the cache entry to master proxy server 107.

In step 502, master proxy server 107 stores the received cache entry in its local cache 210.

In step 503, a determination is made by master proxy server 107 as to whether the resource at the cache entry is invalid or expired.

If the resource at the cache entry is valid and not expired, then master proxy server 107 repeats the determination step of 503 after a duration of time.

If, however, the resource at the cache entry is invalid or expired, then, in step 504, master proxy server 107 informs the appropriate branch proxy servers 103 (those branch proxy servers 103 storing this cached resource) to purge the cache entry containing the resource. Master proxy server 107 may provide an updated version of the resource to be stored in place of the prior version thereby ensuring that all of the branch proxy servers 103 storing this resource are storing the correct version. In this manner, master proxy server 107 ensures that the cached resource is synchronized across branch proxy servers 103 storing this resource thereby preventing branch proxy servers 103 from storing different versions or even invalid or expired versions of the resource.

An illustration of step 504 is provided in FIG. 4. Referring to FIG. 4, if branch proxy servers 103A, 103B both have cached the resource "/foo" which needs to be purged for being invalid or expired, then master proxy server 107 informs branch proxy servers 103A, 103B in steps 408, 409, respectively, to purge the cache entry "/foo" which can be replaced with an updated version of the resource "/foo."

In some implementations, method 500 may include other and/or additional steps that, for clarity, are not depicted. Further, in some implementations, method 500 may be executed in a different order presented and that the order presented in the discussion of FIGS. 4 and 5 is illustrative. Additionally, in some implementations, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for cache sharing among branch proxy servers, the method comprising:
   receiving a request by a first proxy server in a branch office to access a resource at a data center;
   transmitting a request to a second proxy server at said data center to determine if said resource is located in a cache of said second proxy server in response to said first proxy server not storing said resource in its cache;
   creating a cache entry in said cache of said first proxy server to store said resource in response to said second proxy server not storing said resource in its cache; and
   sending said cache entry to said second proxy server to transfer ownership of said cache entry to said second proxy server.

2. The method as recited in claim 1 further comprising:
   fetching said resource by said first proxy server in response to said second proxy server not storing said resource in its cache.

3. The method as recited in claim 1 further comprising:
   receiving said resource by said first proxy server from said second proxy server in response to said second proxy server storing said resource in its cache.

4. The method as recited in claim 1 further comprising:
   receiving said cache entry by said second proxy server from said first proxy server; and
   storing said cache entry in said cache of said second proxy server.

5. The method as recited in claim 4 further comprising:
   informing said first proxy server to purge said cache entry in response to said resource at said cache entry being one of invalid and expired.

6. The method as recited in claim 4 further comprising:
   informing one or more proxy servers at one or more branch offices to purge a cache entry storing said resource in response to said resource at said cache entry being one of invalid and expired.

7. A computer program product embodied in a computer readable storage device for cache sharing among branch proxy servers, the computer program product comprising the programming instructions for:
   receiving a request by a first proxy server in a branch office to access a resource at a data center;
   transmitting a request to a second proxy server at said data center to determine if said resource is located in a cache of said second proxy server in response to said first proxy server not storing said resource in its cache;
   creating a cache entry in said cache of said first proxy server to store said resource in response to said second proxy server not storing said resource in its cache;
   and sending said cache entry to said second proxy server to transfer ownership of said cache entry to said second proxy server.

8. The computer program product as recited in claim 7 further comprising the programming instructions for:
   fetching said resource by said first proxy server in response to said second proxy server not storing said resource in its cache.

9. The computer program product as recited in claim 7 further comprising the programming instructions for:
   receiving said resource by said first proxy server from said second proxy server in response to said second proxy server storing said resource in its cache.

10. The computer program product as recited in claim 7 further comprising the programming instructions for:
    receiving said cache entry by said second proxy server from said first proxy server; and
    storing said cache entry in said cache of said second proxy server.

11. The computer program product as recited in claim 10 further comprising the programming instructions for:
    informing said first proxy server to purge said cache entry in response to said resource at said cache entry being one of invalid and expired.

12. The computer program product as recited in claim 10 further comprising the programming instructions for:
    informing one or more proxy servers at one or more branch offices to purge a cache entry storing said resource in response to said resource at said cache entry being one of invalid and expired.

13. A system, comprising:
    a first proxy server in a branch office connected to a data center, wherein said first proxy server comprises:
      a memory unit for storing a computer program for cache sharing among branch proxy servers; and
      a processor coupled to said memory unit, wherein said processor, responsive to said computer program, comprises
        circuitry for receiving a request to access a resource at said data center;
        circuitry for transmitting a request to a second proxy server at said data center to determine if said resource is located in a cache of said second proxy server in response to said first proxy server not storing said resource in its cache;
        circuitry for creating a cache entry in said cache of said first proxy server to store said resource in response to said second proxy server not storing said resource in its cache; and
        circuitry for sending said cache entry to said second proxy server to transfer ownership of said cache entry to said second proxy server.

14. The system as recited in claim 13, wherein said processor of said first proxy server further comprises:
    circuitry for fetching said resource in response to said second proxy server not storing said resource in its cache.

15. The system as recited in claim 13, wherein said processor of said first proxy server further comprises:
    circuitry for receiving said resource from said second proxy server in response to said second proxy server storing said resource in its cache.

16. The system as recited in claim 13 further comprising:
    said second proxy server located at said data center, wherein said second proxy server comprises:
      a memory unit for storing a computer program for synchronizing cache data among branch proxy servers; and
      a processor coupled to said memory unit, wherein said processor, responsive to said computer program, comprises
        circuitry for receiving said cache entry from said first proxy server; and
        circuitry for storing said cache entry in said cache.

17. The system as recited in claim 16, wherein said processor of said second proxy server further comprises:
    circuitry for informing said first proxy server to purge said cache entry in response to said resource at said cache entry being one of invalid and expired.

18. The system as recited in claim 16, wherein said processor of said second proxy server further comprises:
    circuitry for informing one or more proxy servers at one or more branch offices to purge a cache entry storing said resource in response to said resource at said cache entry being one of invalid and expired.

* * * * *